(12) United States Patent
Maertens et al.

(10) Patent No.: US 7,403,846 B2
(45) Date of Patent: Jul. 22, 2008

(54) METHOD FOR OPERATING A GRAIN CLEANING SYSTEM IN A COMBINE HARVESTER

(75) Inventors: Koen Maertens, Koksijde (BE); Bart M. A. Missotten, Leuven (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/698,520

(22) Filed: Jan. 26, 2007

(65) Prior Publication Data

US 2007/0135935 A1   Jun. 14, 2007

Related U.S. Application Data

(62) Division of application No. 11/092,374, filed on Mar. 29, 2005, now Pat. No. 7,297,052.

(30) Foreign Application Priority Data

Apr. 22, 2004   (GB) ................................ 0408931.4

(51) Int. Cl.
*G06F 7/70* (2006.01)
*G06F 19/00* (2006.01)
*G06G 7/00* (2006.01)
*G06G 7/76* (2006.01)

(52) U.S. Cl. ...................................................... 701/50
(58) Field of Classification Search .................. 701/50, 701/1; 700/284, 28, 31, 48, 208; 209/394; 401/59, 9, 109, 69, 101; 56/10.2 A, 10.2 R, 56/10.2 H, 14.6
See application file for complete search history.

(56) References Cited

U.S. PATENT DOCUMENTS

| | | | |
|---|---|---|---|
| 4,466,230 A | | 8/1984 | Osselaere et al. |
| 4,527,241 A | * | 7/1985 | Sheehan et al. ............... 701/50 |
| 4,548,027 A | * | 10/1985 | Maeoka .................. 56/10.2 G |
| 6,119,442 A | * | 9/2000 | Hale ....................... 56/10.2 H |
| 6,442,916 B1 | * | 9/2002 | Pope ....................... 56/10.2 R |
| 6,591,145 B1 | * | 7/2003 | Hoskinson et al. ............ 700/28 |
| 6,615,570 B2 | | 9/2003 | Beck et al. |
| 6,726,559 B2 | * | 4/2004 | Bischoff ......................... 460/1 |
| 6,761,630 B1 | * | 7/2004 | Schwinn et al. ............. 460/101 |
| 2003/0130766 A1 | * | 7/2003 | Braunhardt et al. ............ 701/1 |
| 2006/0271243 A1 | * | 11/2006 | Behnke et al. ............... 700/284 |
| 2007/0149265 A1 | * | 6/2007 | Behnke et al. .................. 460/1 |

FOREIGN PATENT DOCUMENTS

| | | |
|---|---|---|
| EP | 0463240 | 1/1992 |
| GB | A2063037 | 6/1981 |
| GB | 0408931.4 | 4/2004 |

* cited by examiner

*Primary Examiner*—Árpád Fábián-Kovács
(74) *Attorney, Agent, or Firm*—Michael C. Harms; John William Stader; Patrick M. Sheldrake

(57) ABSTRACT

The present invention relates to a method for improving the operation of a grain cleaning system in a combine harvester characterized in that the method comprises the step of adjusting the position of the upper sieve in the grain cleaning system upon registering a deviance from a threshold value for crop material load on the upper sieve such that the material return flow is adjusted. The present invention further relates to a sieve overload control algorithm capable of activating an optimal sieve control action upon registration of a deviance from a threshold value for crop material load on the upper sieve of a grain cleaning system.

4 Claims, 7 Drawing Sheets

(a) $t_0$=34.8s; $t_1$-$t_0$=12,5s; n= 42

(b) $t_0$=37.6s; $t_1$-$t_0$=9,2s; n= 28

METHOD FOR OPERATING A GRAIN CLEANING SYSTEM IN A COMBINE HARVESTER

CROSS REFERENCE TO RELATED APPLICATIONS

This divisional application claims priority under 35 U.S.C. § 120 from U.S. patent application Ser. No. 11/092,374 filed on Mar. 29, 2005 now U.S. Pat. No. 7,297,052 by Koen Maertens and Bart M. A. Missotten with the same title, the full disclosure of which is hereby incorporated by reference. U.S. patent application Ser. No. 11/092,374 claims priority under 35 U.S.C. § 119 to GB0408931.4, filed on Apr. 22, 2004 titled, "Method for Operating a Grain Cleaning System in a Combine Harvester" and having Koen Maertens and Bart M. A. Missotten as inventors. The full disclosure of GB0408931.4 is hereby fully incorporated herein by reference.

FIELD OF THE INVENTION

The present invention relates to combine harvesters and more particularly relates to a method for improving the operation of a grain cleaning system in a combine harvester.

BACKGROUND OF THE INVENTION

Modern combine harvesters can be used for harvesting and threshing a wide range of agricultural products. Combine harvesters comprise a threshing mechanism wherein the crop material is threshed in order to separate grains from the discardable part of the crop, and grain cleaning units, wherein the clean grain kernels are separated from other crop particles. In particular, in conventional combine harvesters for harvesting crop material, grain is threshed and separated in a threshing and separating mechanism and the separated grain, together with impurities of all sorts, such as chaff, dust, straw particles and tailings, is fed to a cleaning mechanism for cleaning. Clean grain is collected below the cleaning mechanism and fed to a grain tank for temporary storage. The tailings are separated from the clean grain and impurities by means of sieves and provisions are taken for recycling the tailings through the combine harvester for reprocessing. This reprocessing involves either recycling the tailings through the threshing and separating mechanism and/or treating them in a separate tailings rethresher means.

Cleaning sections are operating under a wide range of conditions, which sometimes result in a temporary overload of the sieve sections. Cleaning units in combine harvesters may be temporarily heavily disturbed by local field and crop conditions, such as for instance rapid slope variations or an abrupt increase in crop throughput when the harvester is driven from a low yield spot into a zone with higher yields. Disturbance may also be caused by wrong separation or cleaning settings, difficult cleaning conditions (e.g., from a large amount of green material), or when the threshing settings of the combine harvester are adapted. These transient disturbing effects can result in a sudden overload of the cleaning section, whereby a heap of crop material accumulates locally on the upper sieve of the cleaning unit such that the cleaning unit can not fulfill its function. Moreover, a constant overload of the cleaning mechanism ultimately may lead to a substantial rise of the tailings flow ending up with excessive cleaning losses and finally also with blockages of the tailings return system.

Commonly, the operator attempts to reduce sieve losses in such cases by ground speed control strategies, in particular by reducing the ground speed. Where the ground speed is controlled by an automatic controller in response to a grain loss signal, such controller will decrease the crop throughput setpoint drastically in response to the sieve overload effect, resulting in a minimal ground speed. However, it is not useful to apply ground speed variations once a heap of crop material is present on the upper sieve section because it takes a considerable amount of time to recover from the transient effect, such that a significant amount of crop will be lost before the effects of the new speed have stabilized. Furthermore, the sudden increase of sieve losses disturbs the closed loop behavior of automatic grain loss control algorithms and causes serious discomfort to the operator, when operating in automatic ground speed control mode. No operator supports very well an ongoing succession of accelerations and decelerations of his machine.

It is therefore a general object of the present invention to provide a method for optimizing the operation of a grain cleaning system in a combine harvester during a disturbance in the grain cleaning system. It is in particular an object of the present invention to provide an improved method for reducing sieve losses due to a temporary overload of the upper sieve section in a grain cleaning system.

The present invention also aims to provide an improved grain loss control algorithms which is capable of activating effective sieve control actions in reply of a disturbance in the grain cleaning system.

SUMMARY OF THE INVENTION

In a first aspect, the present invention provides a method for optimizing the operation of a grain cleaning system in a combine harvester during harvesting comprising an upper chaffer sieve and a lower grain sieve disposed the one above the other. The method includes harvesting a crop and guiding said harvested crop to a threshing and separating system in order to separate desired crop material from undesired crop material; guiding at least part of said separated crop material to said grain cleaning system; cleaning the separated crop material in a grain cleaning system by passing the material over the subsequent sieves whereby material that is not discarded from the combine harvester and that does not pass through the lower grain sieve, is returned to the front end of the grain cleaning system for repeating the cleaning action thereby creating a material return flow, and is characterized in that the method further comprises the step of adjusting the position of the upper sieve upon registering a deviance from a threshold value for crop material load on the upper sieve such that the material return flow is adjusted.

The term "deviance from a threshold value" may refer to a value which exceeds the threshold value. In case of registering a value exceeding the threshold value for crop material loaded on the upper sieve, an upper sieve overload situation is registered. The term "overload" as used herein refers to the phenomenon whereby a local heap of crop material is formed on the upper sieve section of a grain cleaning system in a combine harvester.

In a preferred embodiment, the invention relates to a method wherein the step of adjusting the position of the upper sieve comprises adjusting the setting of the upper sieve openings for a suitable period of time. More particularly, the method comprises enlarging the openings of the upper sieve in the grain cleaning system when the threshold value for crop material load on the upper sieve is exceeded, such that the material return flow is increased, thereby constituting a temporary buffer for the excessive crop material and limiting the sieve loss. According to the present method sieve loss reductions of more than 20%, and preferably more than 30%, and even more preferred of more than 50%, depending on the physical constraints of the harvester and the profile of the encountered sieve overload phenomenon can be obtained. Advantageously, the present method enables to obtain a significant increase in dynamic capacity of the cleaning process, especially when harvesting in fields with sharp slope variations and highly variable yields.

The present invention provides an optimized control scenario as answer to a sieve overload phenomenon. In particular, the present invention provides an optimized control scenario as answer to the sieve overload phenomenon and the sieve losses associated therewith. The present method improves the dynamic performance of cleaning units by making explicitly use of the return flow system. This methodology results in a control strategy that uses the return flow system of a combine harvester as a buffer of crop material. This buffer action postpones the handling of superfluous control material during sieve overload to a later stage and realizes a significant increase of the overall performance of a cleaning section.

In another embodiment, the method comprises reducing the openings of the upper sieve in the grain cleaning system when the value for crop material load on the upper sieve goes below said threshold value, such that the material return flow is reduced.

In another embodiment, the method comprises registering a deviance from a threshold value for crop material load on the upper sieve by means of a sensor system. The sensor system may for instance comprise means for detecting variations in yields by measuring the flow of material in the cleaning system. Suitable sensor systems may comprise material flow metering device and mass flow sensors. In a preferred embodiment of the present invention, a deviance from a threshold value for crop material load on the upper sieve is registered by means of a sieve loss sensor system provided adjacent the rear end of the upper sieve. Such sieve loss sensor system is capable of registering the amount of lost grain kernels. This sensor offers interesting information about the instantaneous status of the cleaning process. An example of a suitable sieve loss sensor system is described in EP-A1-0 463 240. Information on the material flow in the cleaning system can equally be derived from a feedrate sensor, e.g., a torque sensor on the straw elevator or the threshing drum, a return flow sensor, air flow sensors in the cleaning system (pressure or air velocity sensors below the sieves), load sensors on the grain pan, etc.

In another embodiment, the sensor system may further comprise means for detecting slope variations in the field. In particular, the method of the present invention comprises registration of a deviance from a threshold value for material load on the upper sieve by means of a field slope sensor system. The use of a field slope sensor system enables to obtain information on the field conditions such as field relief, field slopes, soil conditions, etc., which can be immediately used to adapt sieve settings even before sieve loss peaks are measured. Examples of suitable field slope sensor systems comprise but are not limited to GPS, laser scanning systems, sensors for predicting ground contour of an area in front of the header of a combine harvester, mechanical feelers, acoustic sensor systems, topographic mapping systems, etc. Examples of a suitable field slope sensor system are described in U.S. Pat. No. 4,466,230 and U.S. Pat. No. 6,615,570. It is also conceivable to predict overloads based on overload data from previous runs, gathered during a previous harvest, or from overload data for nearby spots, gathered during the same harvest.

In another embodiment the method according to the present invention comprises automatically adjusting the settings of the upper sieve openings in the grain cleaning system for a suitable period of time upon registering a deviance from a threshold value for crop material load on the upper sieve. In particular, adjustment of the setting of the upper sieve openings is controlled by means of a sieve overload control algorithm.

In another embodiment, the method according to the present invention comprises adjusting the position of the upper sieve by increasing the opening of the upper sieve for a suitable period of time such that the material return flow is increased and thereafter reducing said opening such that the material return flow is reduced. More in particular, according to the present method, the opening of the upper sieve is increased immediately upon registering crop material load on the upper sieve exceeding a threshold value. In another embodiment of the method, the opening of the upper sieve is reduced after a period of time not exceeding the transport delay of the material return flow. In a preferred embodiment of the present method, the opening of the upper sieve is reduced upon registering crop material load on the upper sieve that no longer exceeds the threshold value.

In another embodiment, the present invention provides a method, which further comprises adjusting the ground speed of the combine harvester upon registering a deviance from a threshold value for crop losses. Preferably, the ground speed of the combine harvester will be reduced within the transport time of the return loop system. The temporary application of the special sieve settings still results in a lower sieve load and temporary increase of machine capacity.

In a second aspect, the present invention provides a sieve overload control algorithm capable of activating an optimal sieve control action upon registration of a deviance from a threshold value for crop material load on the upper sieve of a grain cleaning system. The present dynamic sieve overload algorithm reduces the large peaks of sieve losses that are typically measured when harvesting at high throughput rates. The present algorithm enables to dynamically increase the cleaning capacity and to improve the robustness and stability of sieve loss control algorithms. This robustness increase will make it possible to apply higher controller gains, which provides a higher performance and comfort of the control algorithm. Advantageously, the sieve overload algorithm can be installed on the current commercial combine harvesters without the need for extra hardware components.

In another aspect, the present invention therefore also relates to the use of the above cleaning system control method in a control system capable of adjusting the ground speed of the harvester in accordance with the registered rate of crop load taken in by the harvester and/or registered sieve losses. In a preferred embodiment, a method according to the present invention is used in a control algorithm for adjusting the ground speed of the combine harvester upon registering a deviance from a further threshold value for crop losses and/or for an intake crop load rate. Opening the upper sieve at the appropriate time prevents an over-reaction of the control system to temporary sieve overloads and consequent sieve losses. The ground speed control algorithm is the continuously active algorithm which tries to limit losses to a small value, e.g. 2%. Upon registering (transient) higher loss values, e.g. exceeding the 5% threshold, or upon registering (transient) loss-entailing conditions, e.g. field slope changes, the cleaning control method according to the present invention may be activated.

DETAILED DESCRIPTION OF THE FIGURES

Figure 3:
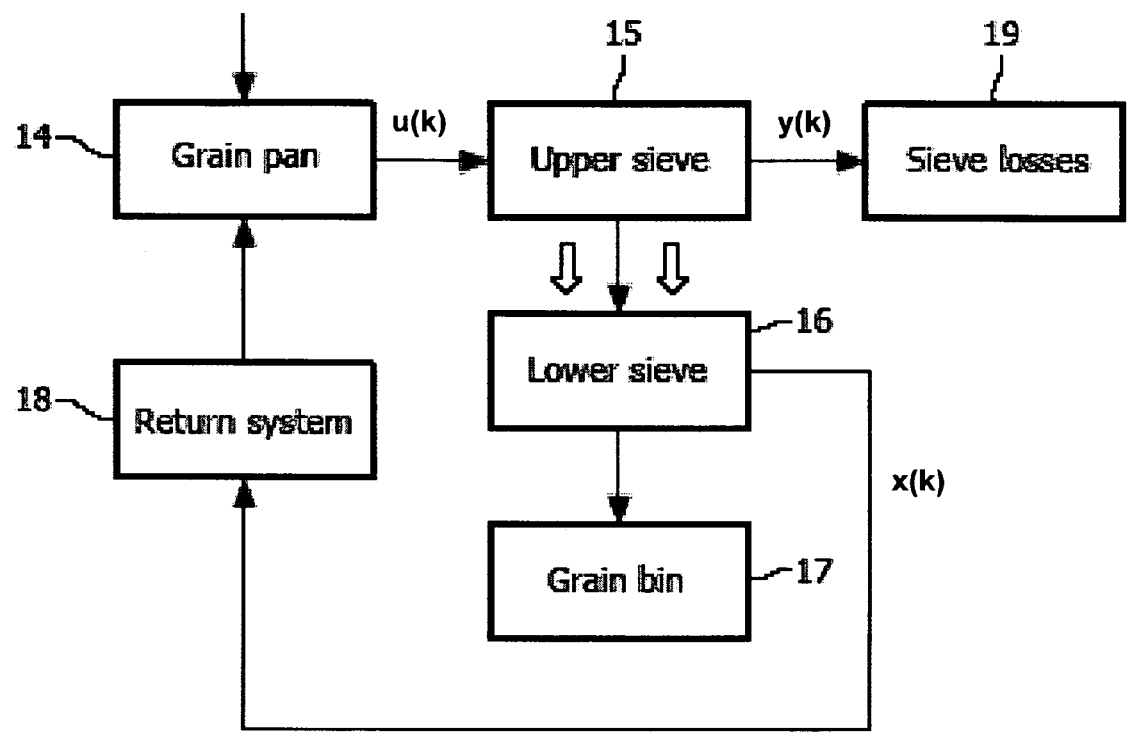
Figure 4:
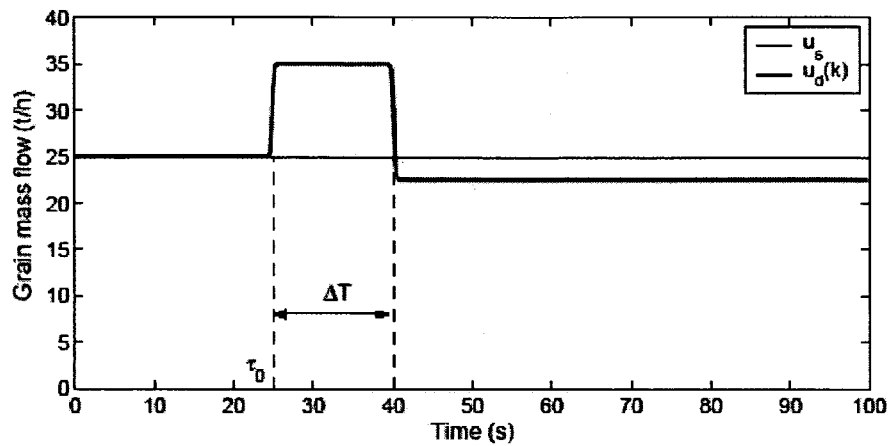
Figure 5:
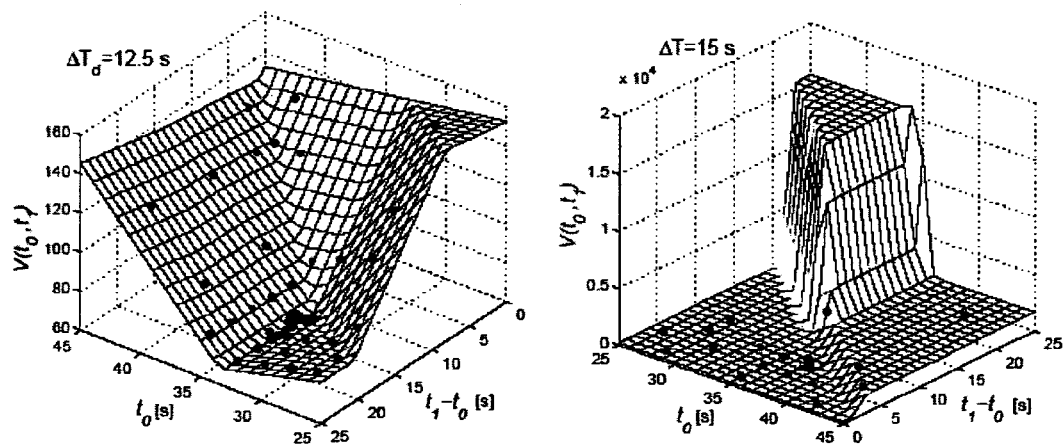
Figure 6:
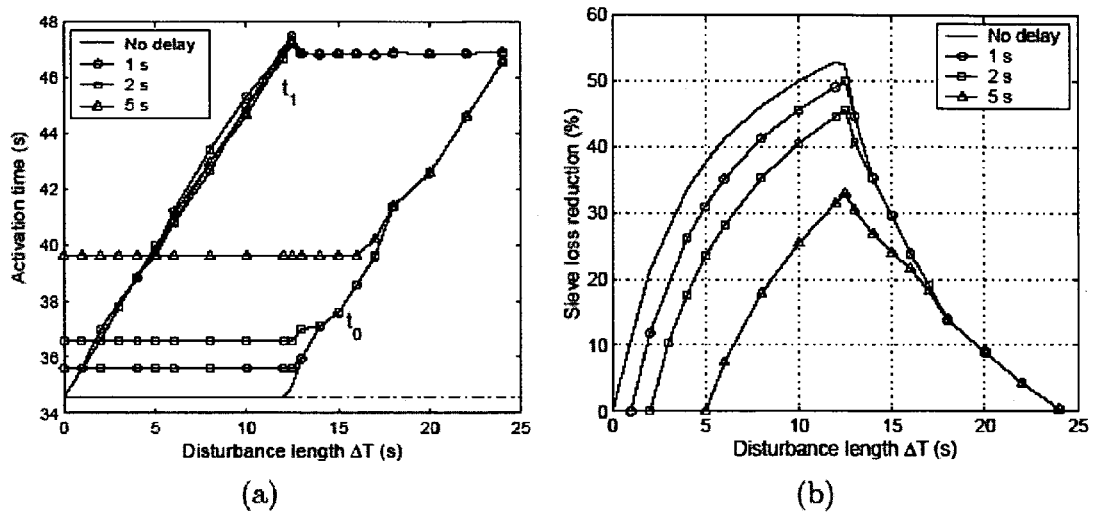
Figure 7:
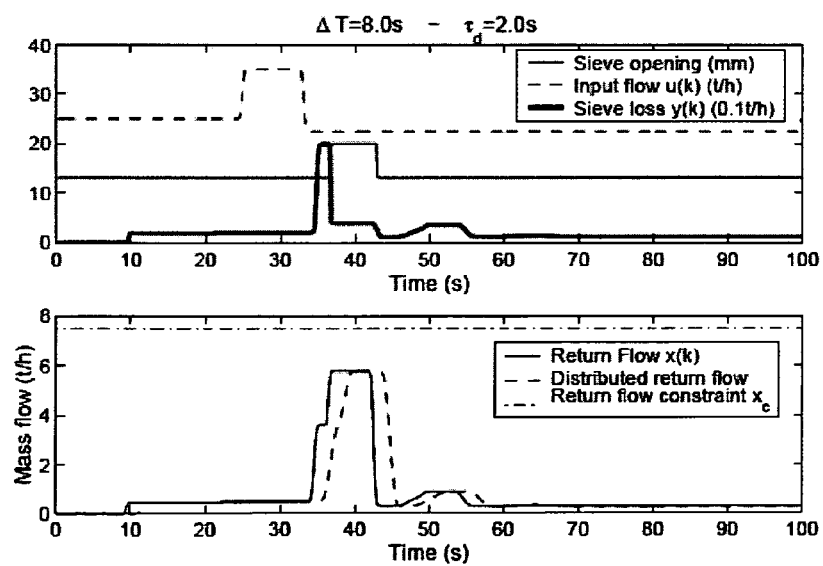
Figure 8:
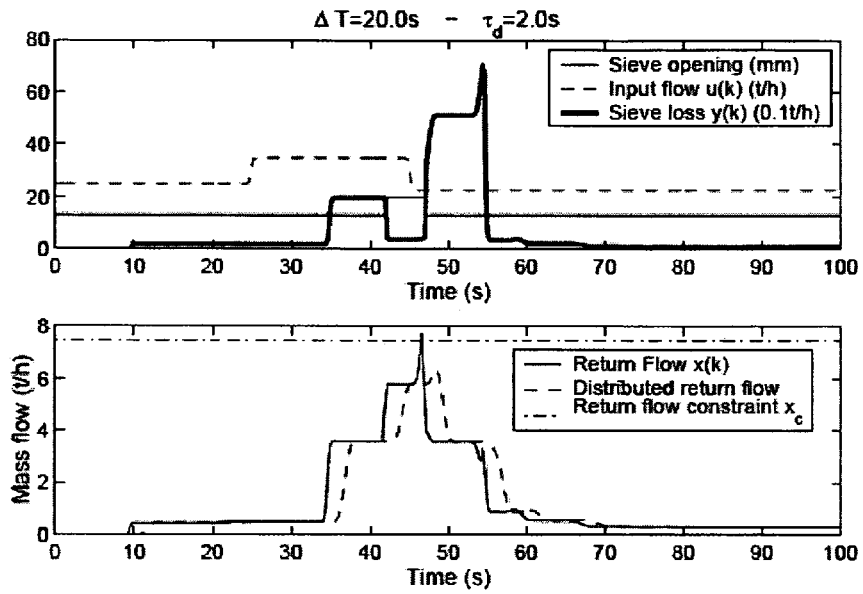
Figure 9:
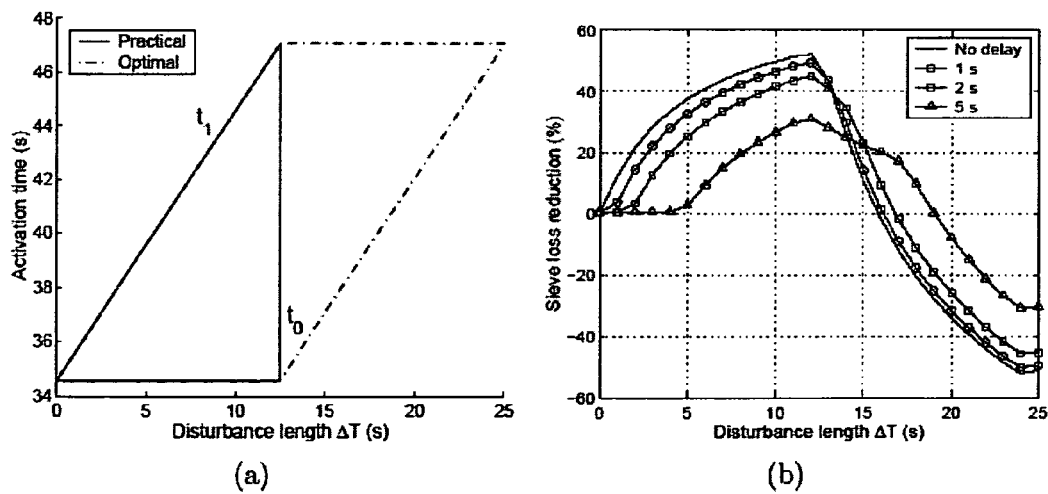
Figure 10:
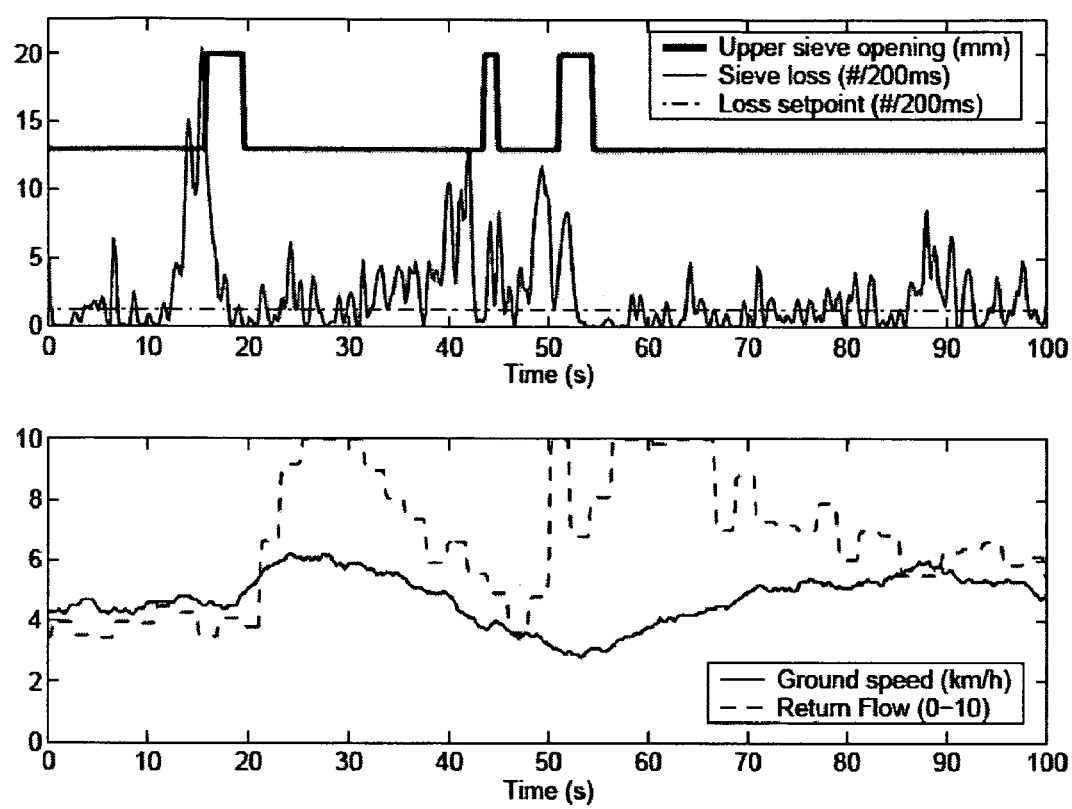

FIG. 3 provides an overview of the subsequent grain cleaning steps in the grain cleaning system during an overload situation according to a method of the present invention;

FIG. 4 illustrates an example of a 15s-sieve load disturbance as it was standard used during all simulation experiments performed to establish the sieve overload control algorithm;

FIGS. 5($a$) and ($b$) show the cost functions that correspond to an input flow disturbance of 12.5s and 15s, respectively. The optimal sieve opening parameters are added below each plot together with the number of function evaluations n;

FIG. 6 illustrates optimal sieve control parameters $t_o$ and $t_1$ (a) and the corresponding reduction of the total sieve losses (b) for different disturbance lengths $\Delta T$ and delays of the sieve overload detection algorithm;

FIG. 7 represents optimal sieve control action for an 8 s overload period. FIG. 8 illustrates the effects of return flow restriction ($x_c$=7.5s) on the optimal sieve control;

FIG. 9 is an illustration of a practical implementation of the sieve loss reduction algorithm (a) and the resulting sieve loss reduction values (b) for different disturbance periods $\Delta T$ and detection delays $\tau_d$; and FIG. 10 shows measured sieve control actions during corn harvest in automatic grain loss control mode.

DETAILED DESCRIPTION OF THE PREFERRED EMBODIMENTS

The term "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings".

The term "desired crop material" as used herein refers to crop material that is separated from the discardable part of the crop material and includes "grain" and "tailings". The term "undesired material" as used herein refers to the discardable part of the harvested crop material, and mainly consists of straw and chaff.

Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. The terms "crop material" or "crop" may refer to any material, which can be harvested with a combine harvester, such as wheat, barley, rye, corn or rice. These terms should not be construed as limiting.

A diagrammatic side elevation of a combine harvester comprising a threshing mechanism and a grain cleaning system is provided in FIG.2 of GB-A-2 063 037. As the combine harvester is propelled forwardly over a field with standing crop, the latter is severed from the stubble and guided to a threshing and separating mechanism. The crop received therein is threshed and separated, that is to say, the crop is rubbed and beaten, whereby the grain, seed or the like, is loosened and separated from the straw, coils or other discardable part of the crop. A mat of remaining crop material, i.e. mainly straw as most grain is separated therefrom, is comminuted and discharged from the harvester and ejection onto the field.

Figure 1:
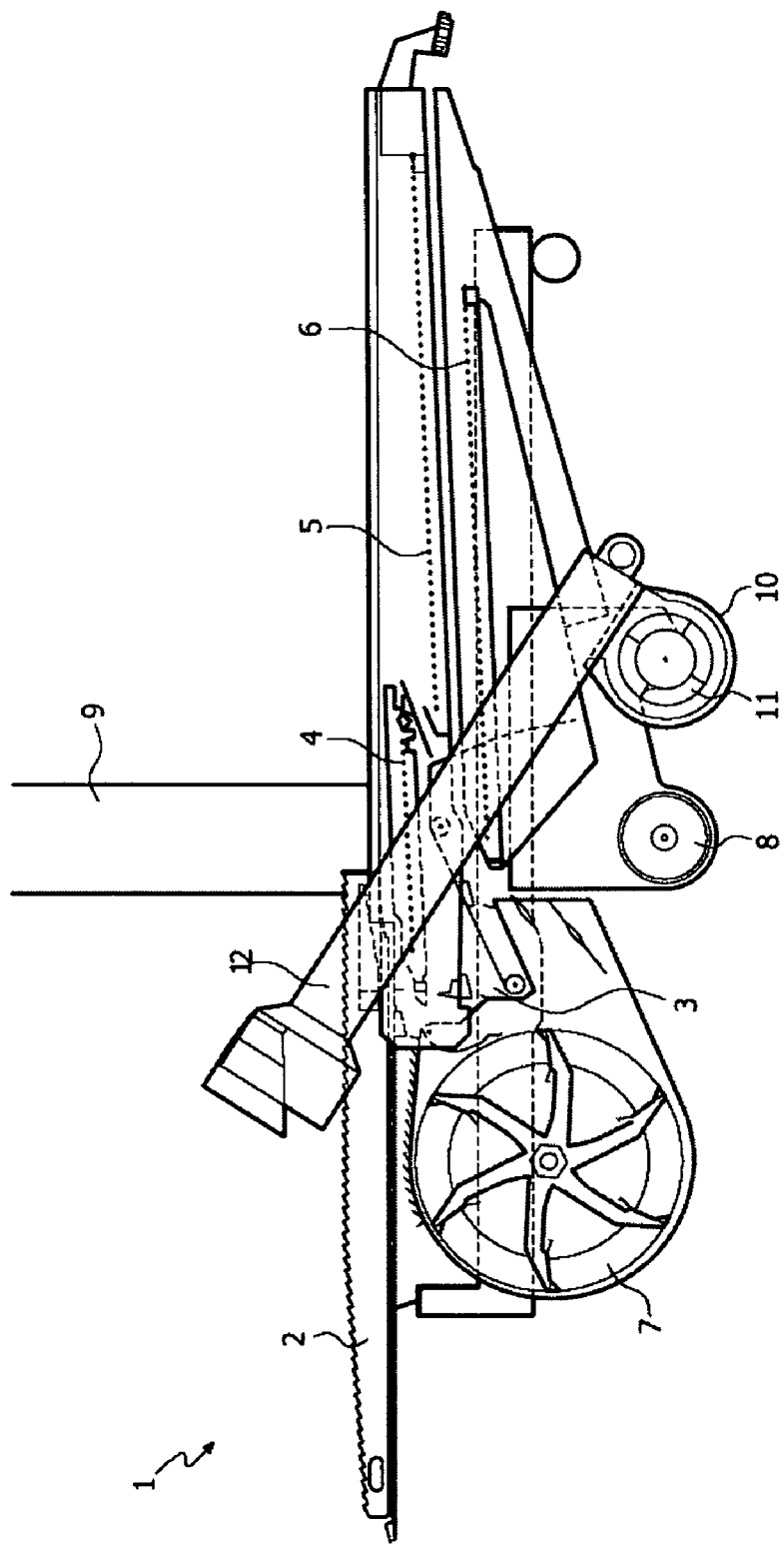
FIG. 1 illustrates a preferred embodiment of a grain cleaning system for use in a combine harvester.

Grain which has been separated by the threshing and separating mechanism falls into a grain cleaning system 1, of which an embodiment is represented in FIG. 1. The grains fall onto a first grain pan 2 of the cleaning mechanism 1, which further also comprises a pre-cleaning sieve 4 positioned above a second grain pan 3, an upper chaffer sieve 5 and a lower grain sieve 6, disposed the one above the other behind and below the pre-cleaning sieve 4, and a cleaning fan 7. The first grain pan collects the separated grain particles from the separation drums and walkers section of the combine harvester and transports the mixture of chaff and grain to the front end of the pre-cleaning sieve 4. The pre-cleaning sieve 4 separates a first amount of grain kernels from the total mass of crop material and delivers its residual fraction to the upper sieve 5. The upper sieve separates the small fraction from the larger particles. The residual fraction of chaffs, short straw and other sieve losses leaves the back side of the upper sieve 5, while the separated fraction is processed by the lower sieve 6. This lower sieve 6 separates the clean grain fraction from the return flow fraction. Latter material flow is transported to the grain pan 2 via a double cross auger and two fast rotating return augers that both end in impellers (not shown).

The grain pans 2, 3 and the sieves 4, 5, 6 are oscillated generally back-and-forth for transporting threshed and separated grain from the first grain pan 2 to the pre-cleaning sieve 4 and the second grain pan 3 and therefrom to the sieves 5, 6. The same oscillatory movement spreads said grain across said sieves 4, 5, 6, while permitting the passage of cleaned grain by gravity through the apertures of these sieves. The grain on the sieves 4, 5, 6 is subjected to a cleaning action by the fan 7 which provides an air flow through said sieves to remove chaff and other impurities such as dust from the grain by making this material airborne for discharge from the machine. Clean grain falls to a clean grain auger (not shown) in a clean grain auger trough 8 and is subsequently transferred by the auger and an elevator mechanism 9 to the grain tank (not shown). Incompletely threshed ears, the so-called "tailings", do not pass through the upper sieve 5, but upon reaching the end thereof, fall to a tailings auger (not shown) in a tailings auger trough 10. The tailings are transported sideways by this auger to a separate rethresher 11 and returned by a tailings elevator 12 to the first grain pan 2 for repeated cleaning action. Impellers at the upper end of the tailings elevator 12 spread the returned crop over the full width of the grain pan 2. The above-described mechanism of the tailings auger, the rethresher 11 and the tailings elevator 12 is also referred to as to a "return flow system".

The upper sieve is generally constructed of a series of transversely extending and pivotally mounted louvers, each of which has a convoluted shape to define openings there through. The size of these openings is determined by the pivoted position of the individual slats. Typically, an adjustment mechanism will interconnect all of the pivoted slats to control the pivoted position thereof and, therefore, the size of the openings through the sieve.

As mentioned above, overload in the upper sieve of the grain cleaning system may result in considerable crop loss.

Throughout the description, there will be referred to a variation in the slope of the field as cause for temporary overload of the upper sieve in a grain cleaning system. However, it should be clear from the present description that overload problems caused by other transient effects, e.g. higher yield load on certain field spots or changes to threshing settings of the harvester, may be solved as well with the improved method according to the present invention.

Figures 2A, 2B:
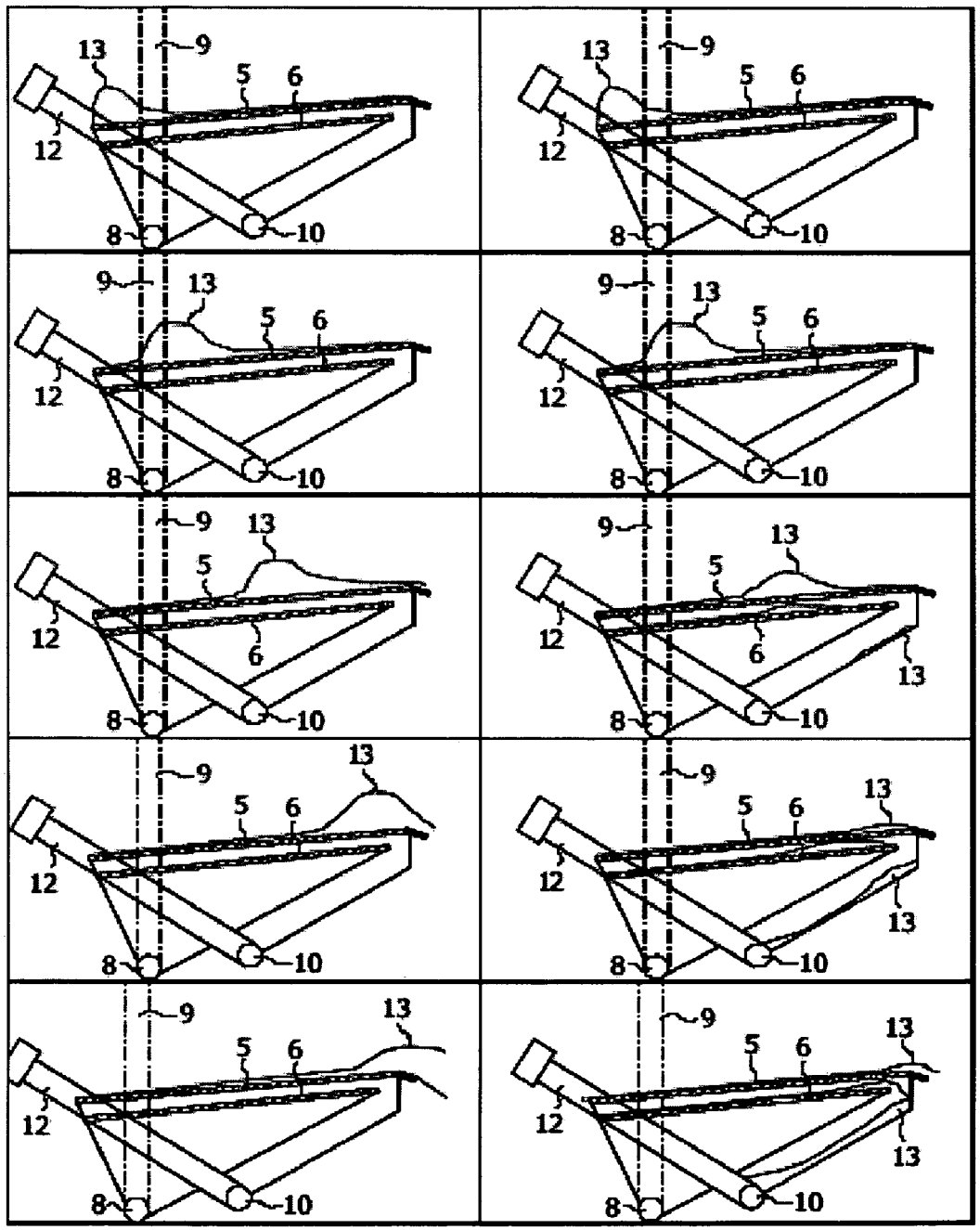
FIG. 2 is a diagrammatic representation of the response of the grain cleaning section as realized by a standard passive configuration (FIG. 2A) and an active sieve overload control algorithm (FIG. 2B)

Transient effects will result in a local heap of crop material 13 onto the upper sieve 5, as illustrated on FIG. 2A. For example, while the combine harvester is travelling downhill, the movement of the threshed crop material over the first grain pan 2 slows down and a thick layer may develop on top thereof. When the harvester suddenly starts travelling uphill, this material will rapidly shift rearwardly and make a pile of threshed material 13 on the front section of the upper sieve 5. This local pile of material 13 will move backwards on the upper sieve 5 until it leaves the machine at the end of the upper sieve 5, which will be registered as a sudden increase of the sieve loss signal. The sudden increase of sieve losses can be detected by monitoring consequent sieve loss values. Large heaps of crop material will cause a long series of non-zero sieve loss values, while zero sieve loss values are frequently measured during a normal cleaning operation. When operating in automatic sieve loss control mode, a sudden increase of the local crop layer is typically followed by a narrow layer of crop material. Prior art control algorithms will react to these losses and will generate a control signal to strongly reduce the ground speed of the harvester. Although this approach offers a good method to detect and limit permanent sieve overload, the reaction still comes too late and a significant amount of the crop material will be lost.

According to the present invention, the above-described return flow system is used as temporary buffer to avoid high sieve losses. In particular, referring to FIG. 2B, local accumulation of crop material 13 on the upper sieve 5 is detected and the pile 13 of material is propagated backwards. Upon detection of an overload, the opening of the upper sieve 5 is adjusted, i.e. the positions of the upper sieve louvers are adjusted and the openings are set as wide as possible. The apertures of the upper sieve are enlarged for a suitable period of time such that the overload of crop material can pass by gravity and oscillation of the sieve through the openings of this upper sieve and fall onto the lower sieve 6. The crop material that falls onto the lower sieve 6 merely comprises incompletely cleaned grains and/or tailings. The grain, which constitutes a small part of this material, will sift through the lower sieve 6 in the clean grain auger trough 8 and be transferred by the auger and an elevator mechanism 9 to the grain tank. The remaining part of the material will be propagated backwards until it leaves the lower sieve 6 at its end to fall in the tailings auger trough 10 and to be returned by the tailings elevator 12 to the first grain pan 2 for repeated cleaning action. The total amount of material that is present in the local heap 13 can thus be processed by the upper sieve 5 as it is being spread out across a larger separation length. The return flow can be controlled by varying the setting of the upper sieve. While the harvester is further driving uphill in the field, a stable layer of material has accumulated on the first grain pan 2 and the upper sieve 5 and the crop material which is comprised in the return flow system can be efficiently processed.

FIG. 3 provides an overview of the subsequent grain cleaning steps in the grain cleaning system during an overload situation according to a method of the present invention. As shown in box 14 the grain pan collects and transports the mixture of chaff and grain u(k), over a pre-cleaning sieve, to the upper sieve, as indicated in box 15. In a situation of overload of the upper sieve, a major part of the material will fall through the enlarged openings of the upper sieve 5 onto the lower sieve, as indicated in box 16. A smaller part of material y(k) is propagated backwards and consists of sieve losses as indicated in box 19. A small part of the material received on the lower sieve 6 will fall through the lower sieve 6 and will be transferred to a grain bin as indicated by box 17. The remaining part of the material x(k) will be propagated backwards until it leaves the lower sieve 6 at its end to be returned by the return system, indicated by box 18, to the grain pan indicated with box 14 for repeated cleaning action.

According to one embodiment of the present invention, the apertures of the upper sieve 5 will be enlarged as much as possible when sieve overload is detected or predicted. This special setting can be applied during the transport time within the return flow system, i.e. the time for the material to get from the end of the lower sieve 6 to the front end of the pre-cleaning sieve 4. This transport time is dependent only on the configuration of the combine harvester and comprises typically 10 to 15 seconds. For most transient phenomena, this period of time is long enough to free the upper sieve of overload material. It is preferred to avoid longer opening times in order to prevent blockage of the return flow system. Longer opening times significantly increase the amount of crop material that is present in the cleaning system 1 and therefore strongly reduce the cleaning performance of the combine harvester.

The following paragraphs refer to the establishment of a sieve overload control algorithm, able to detect an overload phenomenon, i.e. a heap of crop material on the upper sieve section, and to set off active ground speed control algorithms. In addition, the present algorithm further activates an optimal sieve control action in order to reduce the sieve losses and to remove the heap of material. The upper sieve opening has a direct impact on the cleaning process and can, according to an aspect of the present invention, be tuned in order to optimize the dynamic response of the cleaning unit. A virtual cleaning unit can be used as model to determine the sieve control strategy that produces an optimal cleaning performance.

The return flow model of FIG. 3 offers a tool to analyze the dynamic behavior of the cleaning section by applying different disturbance sequences and sieve control actions. A global optimization methodology will be presented hereunder to optimize a predefined objective function by choosing the appropriate sieve control action. The dynamic behavior of each element in the boxes of FIG. 3 can be described by formulae which are implemented in Simulink and exported to a Matlab-workspace for further evaluation.

For input sequence parameterization, all possible sets of sieve opening strategies can be used as candidate profiles of the input sequence. An open-close sieve control action is proposed. Two parameters describe this sieve action: time instance $t_0(s)$ determines the activation time of the special sieve setting, i.e. when the upper sieve opening is set at its maximum value and time instance $t_1(s)$ fixes the closing action, thus the time instance at which the nominal sieve settings are restored.

The parameter u(k) as used in the present description refers to the flow of crop material that is transported to the front end of the pre-sieve in a grain cleaning section. The parameter y(k) as used in the present description refers to the flow of crop material that leaves the back side of the upper sieve and thus comprises sieve losses. The parameter x(k) as used herein refers to the return flow fraction of material.

Different sieve load disturbances u(k) were applied to the model to generate the overload phenomenon. FIG. 4 illustrates an example of a simulated ΔT seconds lasting sieve overload disturbance that is applied at the front end of the pre-sieve at instance $\tau_o$. The initial 25t/h of incoming crop flow is kept constant for 25 seconds to remove transient effects from the simulated overload phenomenon. After ΔT seconds, the grain throughput is lowered to a level that lies below the original one, as it would be the result during automatic grain loss control operation. This lower input flow is induced by a corrective action of the operator or ground speed controller.

The parameters of the sieve opening sequence will be tuned to attain an optimal dynamic behavior of the cleaning unit. Equation 1 presents a suitable objective function, in particular a cost function $V(t_0, t_1)$, which can be used to optimize both parameters $t_0$ and $t_1$.

$$V(t_0, t_1) = \sum_{k=\tau_0}^{T_{sim}} y(k) + \gamma \sum_{k=\tau_0}^{T_{sim}} (x(k) - x_c)_+^2 + \rho(t_1 - t_0) \quad \text{Equation 1}$$

This function is composed of three terms that are weighted by parameters γ and ρ.

- Cost $\sum_{k=\tau_0}^{T_{sim}} y(k)$ calculates the total amount of sieve losses that are simulated in the $[\tau_0, T_{sim}]$ interval ($\tau_0 = 25$ s, $T_{sim} = 100$ s)
- Quadratic term $\gamma \sum_{k=\tau_0}^{T_{sim}} (x(k) - x_c)_+^2$ introduces a soft constraint on the instantaneous return flow $x(k) < x_c$ to avoid overload in the return flow system (γ=2.5).
- Time interval $\rho(t_1 - t_0)$ penalizes long activation intervals of the special settings. This linear term is added to reduce the impact of the special sieve settings on the composition of the clean grain flow (ρ=1.0)

A next step consists of search for the optimal sieve control parameters to and $t_1$. However, this optimization problem is not convex for all disturbance parameters, which makes it necessary to apply global optimization techniques. The non-linear input-output characteristics and the integrating action of the different machine elements make it impossible to find an analytical solution for the optimization problem. Numerical optimization strategies are therefore required to find a globally optimal sieve control action. A Lipschitzian optimization technique offers good opportunities for this type of optimization problems. This search algorithm realizes a direct global optimization technique with a minimal amount of precious simulation runs and a priori information concerning the shape of the cost function.

Simulating the dynamic response of the return flow model makes it possible to gain insight in the shape of the cost function and by this, the optimization problem. FIG. 5 presents the objective functions $V(t_0, t_1)$ of two different optimization problems:

(a) This figure is caused by a short-term overload flow (ΔT<12.5 s) and is characterized by a nearly convex cost function. The 12.5 s-disturbance resulted in a nearly convex objective function that can be tackled with local optimization techniques in order to find optimal $t_0$ and $t_1$ values.

(b) The plot arises from a sieve overload phenomenon that lasts longer that the 12.5 s return flow delay and reveals a non-convex optimization problem. Disturbances that last significantly longer than the return loop time (±12.5 s) are penalized by the return flow restriction $x_c$, making the resulting cost function non-convex in terms of $t_0$ and $t_1$.

The return flow restriction $x_c$=7.5 t/h introduced a ridge at $t_1$=39 s in the global cost function as illustrated by FIG. 5(b). This extra cost term suggests to avoid open upper sieve times that last longer than 14 s after the start of the overload disturbance. This period corresponds to the transport time (15 s) for the material to get from the end of the lower sieve 6 to the front end of the pre-sieve 4. Longer opening times significantly increase the amount of crop material that is present in the cleaning section and therefore strongly reduce the cleaning performance of the combine harvester.

Finding an optimal set of input sequence parameters $t_0$ and $t_1$ for different disturbance lengths ΔT makes it possible to introduce a set of rules that guarantee an optimal sieve control strategy in terms of sieve losses and return flow restrictions. The results from a set of optimization runs are presented in FIG. 6. Each dot optimal results for a certain disturbance interval ΔT and detection time $\tau_d$. Latter detection time corresponds to the minimal time that is needed to detect sieve overload on the basis of the signal of a sieve loss sensor, which is installed at the end of upper sieve 5. The ideal overload algorithm corresponds to a detection technique that recognizes sieve overload on the basis of one single measurement and is able to apply the special settings within the same time instance. Detection delays $\tau_d$ of 1, 2 and 5 seconds are more feasible to realize.

FIG. 7 shows the output of a simulated response of the return flow model of FIG. 3. A disturbance of 8 s (=ΔT) is injected into the system after 25 seconds. The upper sieve was opened 2.0 s (=$\tau_d$) after the beginning of the sieve loss peak and put back to its standard position 8 s later. The dynamic sieve control action resulted in a 35.2% reduction of the total amount of sieve losses in the [25, 100] measurement interval. This reduction was realized by cleaning the extra bunch of material after the temporary sieve overload had passed. The return flow restriction did not act as an active constraint in this scenario.

An optimal sieve overload strategy can be determined on the basis of FIG. 5(a):

If $\tau_d < \Delta T < 12.5\ s + \tau_d$:

open the upper sieve as fast as possible after detection of sieve overload. Close the upper sieve again once the process is stabilized or the disturbance lasted longer than 12.5 s (FIG. 7).

If $12.5s + \tau_d \leq \Delta T < 25.0s$:

the overload lasts too long to buffer all crop material in the return flow system without an excessive return flow. The upper sieve should be opened at ΔT+12.5s and closed again 25s after the start of the overload disturbance (FIG. 8).

If $\Delta T \geq 25.0\ s$:

no action can be taken without violating the maximum allowable return flow rate.

In FIG. 8 a longer overload interval of 20s (=ΔT) was applied to the cleaning system. The return flow restriction ($x_c$=7.5s) limited the maximum amount of crop material that could be processed at a later time instance and by this, the achievable loss reduction (8.9%).

The complete optimal sieve control action as proposed in previous paragraphs can not be implemented when the length of the sieve overload disturbance ΔT is not known on beforehand (FIG.8). In such case the sieve control algorithm should be restricted to the first rule as proposed in FIG. 9(a). A slightly adapted, but causal sieve control strategy is shown in the left plot and can be described as "Once sieve overload is detected, open the upper sieve until the phenomenon has passed or the special cleaning setting was active for an interval corresponding to the transport time in the return system."

Above rule proposes to use the return flow system as a buffer that postpones the processing of the superfluous material. The disturbance interval ΔT does not exceed an interval corresponding to the transport time in the return system The 12.5s restriction in the example above corresponds to the transport delay in the return flow system and avoids overload. The single rule control action still achieves a significant loss reduction under condition of a limited disturbance period (ΔT<15s) as illustrated in FIG. 9(b).

The sieve control strategy was implemented and evaluated in a combine equipped with a loss control system, while harvesting corn. A measured sieve control action under automatic control operation is shown in FIG. 10. The return flow was measured at the end of the return flow augers as proposed by Strubbe and Paquet in EP 0 463 240. The return flow control algorithm was triggered three times. The active ground keep controller kept sieve overload intervals within the 12.5s period, which made it possible to reduce the sieve losses as proposed in the practical scheme of FIG. 9. The special upper sieve settings further resulted in a significant decrease of the sieve losses and a significant increase of the return flow rate. The ground speed sequence that resulted from the grain loss control algorithm was comfortable in contrast to sieve loss control action with fixed settings of the cleaning system 1 (passive cleaning action).

In conclusion, the above-presented model and algorithm was constructed on the basis of physical insight and measured input-output characteristics. The transport time in the return flow system of cleaning sections was identified as an important parameter to describe the system's dynamics. A global optimization technique was applied to search for an optimal control of the return flow rate in order to reduce the sieve losses within acceptable operating conditions. The optimization technique was applied to reduce the sieve losses in combines by using the return flow system as a material buffer that postpones the handling of superfluous material at a later stage. This simple control algorithm realizes an important increase of the dynamic cleaning efficiency and has been shown to be successfully implementable in the field during harvest in automatic grain loss control mode.

What is claimed is:

1. A method of activating an optimal sieve control action, the method comprising:

registration of a deviance from a threshold value for crop material load on the upper sieve of a grain cleaning system, wherein the sieve control action comprises a open-close sieve control action which is determined by the parameter $t_0(s)$, representing the activation time of a special sieve setting, and the parameter $t_1(s)$, representing the time at which the nominal sieve setting is restored, wherein the parameters $t_0(s)$ and $t_1(s)$ are optimized according to the cost function $V(t_0, t_1)$, following $$V(t_0, t_1) = \sum_{k=\tau_0}^{T_{sim}} y(k) + \gamma \sum_{k=\tau_0}^{T_{sim}} (x(k) - x_c)_+^2 + \rho(t_1 - t_0)$$

wherein
u(k) represents the flow of crop material that is transported to the front end of the pre-sieve in a grain cleaning system, y(k) represents the flow of material that leaves the back side of the upper sieve, and x(k) represents the return flow fraction of crop material, wherein $$-\sum_{k=\tau_0}^{T_{sim}} y(k)$$

calculates the total amount of sieve losses that are simulated in the $[\tau_0, T_{sim}]$ interval wherein $$\gamma \sum_{k=\tau_0}^{T_{sim}} (x(k) - x_C)_+^2$$

introduces a soft constraint on the instantaneous return flow $x(k) < x_c$ to avoid overload in the return flow system, and wherein
time interval $\rho(t_1-t_0)$ penalizes long activation intervals of the special settings.

2. The method according to claim 1, wherein a set of rules is established that guarantee an optimal sieve control strategy in terms of sieve losses and return flow restrictions based on the parameters $t_0(s)$ and $t_1(s)$ that were optimized for different disturbance intervals ΔT and detection times $\tau_d$.

3. The method according to claim 2, wherein the rule comprises opening the upper sieve upon detecting sieve overload until the overload phenomenon has passed or until the special cleaning setting was active for an interval corresponding to the transport time in the return system.

4. The method according to claim 2, wherein the disturbance interval ΔT does not exceed an interval corresponding to the transport time in the return system.

* * * * *